United States Patent [19]

Sato et al.

[11] Patent Number: 5,280,728
[45] Date of Patent: Jan. 25, 1994

[54] ULTRASONIC FLOW VELOCITY MEASUREMENT METHOD AND APPARATUS THEREOF

[75] Inventors: Toshio Sato; Ryohei Motegi, both of Tokyo, Japan

[73] Assignee: Tokimec Inc., Tokyo, Japan

[21] Appl. No.: 782,095

[22] Filed: Oct. 24, 1991

[30] Foreign Application Priority Data

Nov. 5, 1990 [JP] Japan .................. 2-299234

[51] Int. Cl.[5] .................................................. G01F 1/66
[52] U.S. Cl. ...................................................... 73/861.28
[58] Field of Search ........... 73/861.25, 861.27, 861.28, 73/861.29, 861.31, 861.18

[56] References Cited

U.S. PATENT DOCUMENTS

| | | | |
|---|---|---|---|
| 3,575,050 | 4/1971 | Lynnworth | 73/861.27 |
| 4,454,767 | 6/1984 | Shinkai et al. | 73/861.18 |
| 4,467,659 | 8/1984 | Baumoel | 73/644 |
| 4,735,097 | 4/1988 | Lynnworth | 73/861.28 |
| 4,930,358 | 6/1990 | Motegi et al. | |

Primary Examiner—Michael T. Razavi
Assistant Examiner—Timothy J. May
Attorney, Agent, or Firm—Sandler Greenblum & Bernstein

[57] ABSTRACT

An ultrasonic flow velocity measurement method and apparatus thereof and comprises ultrasonic wave transducers disposed on the upstream and downstream sides of a pipe and a control apparatus connected to these ultrasonic wave transducers. Concerning the flow velocity measurement, an average propagation sound velocity in the wedge which forms the ultrasonic wave transducers and the sound velocity on the surface where the wedge is brought into contact with the pipe are measured. The time from when ultrasonic waves are originated from the upstream side to the downstream side and and vice versa and to when they are received is measured. These measured values and the distance between the ultrasonic wave transducers are substituted for a predetermined function to determine the flow velocity of a fluid inside the pipe.

5 Claims, 8 Drawing Sheets (EXAMPE OF RECEIVED SIGNALS)

ULTRASONIC FLOW VELOCITY MEASUREMENT METHOD AND APPARATUS THEREOF

BACKGROUND OF THE INVENTION

1. Field of the Invention

The present invention relates to an ultrasonic flow velocity measurement method and apparatus thereof. More particularly, the present invention relates to an ultrasonic flow velocity measurement method in which ultrasonic wave transducers are installed on the outer surface of a pipe and the flow velocity of a fluid at a high temperature and pressure or at a low temperature inside the pipe is measured, and to an apparatus thereof.

2. Description of the Related Art

An example of the prior art shown in FIGS. 9 and 10 is disclosed in U.S. Pat. No. 4,930,358.

In these figures, reference numeral 51 denotes one of the ultrasonic wave transducers mounted on the upstream side of a pipe 3, and reference numeral 52 denotes the other ultrasonic wave transducer mounted on the downstream side of the pipe 3. The ultrasonic wave transducer 51 comprises a wedge member 51A for making ultrasonic waves enter the pipe 3 obliquely and a vibrator 51B, as shown in FIG. 10. The wedge member 51A is formed of an acrylic resin and the cross section thereof is shaped as a trapezoid. The ultrasonic vibrator 51B is fixedly mounted on one of the inclined surfaces 51a thereof. The other inclined surface 51C forms an ultrasonic reflection surface intersecting at right angles with a propagation path when ultrasonic waves originated from the vibrator 51B are reflected by a surface 51b serving as an ultrasonic incident surface and the ultrasonic waves are propagated within the wedge member 51A. Hence, internal reflection waves propagated inside the wedge member 51A return to the vibrator 51B.

If this propagation time is denoted as $t_p$, a sound velocity $C_1$ within a wedge inside the ultrasonic wave transducers 51 and 52 can be determined by the following equation:

$$C_1 = 2(l_1 + l'_1)/(t_p - \tau_e) \quad \text{①}$$

where $l_1$ and $l'_1$ are the length of the paths $l_1$ and $l'_1$ shown in FIG. 10, respectively, and $\tau_e$ is an electrical delay time inside a cable or the like. The length b of the incident surface 51b which serves as an opening surface when ultrasonic waves inside a pipe are emanated, is set at almost 18 wavelengths or even greater with respect to the central frequency used.

Since a directional angle becomes very small when the opening of the vibrator 51B is somewhat long and the length b of the incident surface 51b is almost 18 wavelengths or even greater as shown in FIG. 9, an ultrasonic beam, which is propagated in turn in the wedge section inside the ultrasonic wave transducer, in the pipe section and in the fluid section inside the pipe, is regarded as a substantially parallel beam.

Ultrasonic waves outputted from the vibrator 51B of the ultrasonic wave transducer 51 toward the downstream side pass through a propagation path consisting of parallel beams shown by a slanted line in FIG. 9 and reach the ultrasonic vibrator 52B of the other ultrasonic wave transducer 52. The propagation time in this case is denoted as $t_d$.

Ultrasonic waves outputted from the vibrator 52B of the ultrasonic wave transducer 52 toward the upstream side reach an ultrasonic vibrator 51B of the other ultrasonic wave transducer 51. The propagation time in this case is denoted as $t_u$.

In such a case, a flow velocity V inside the pipe 3 can be determined by the following equation:

$$V = \frac{C_1^3}{\sin\theta_1} \cdot \frac{(t_u + t_d - 2\tau)}{C_1^2 \cdot (t_u + t_d - 2\tau)^2 + (2ND\sin\theta_1)^2} \cdot (t_u - t_d) \quad \text{②}$$

where $$\tau = \frac{L_x}{C_1}\sin\theta_1 + \frac{2d}{C_1 C_2} \cdot \sqrt{C_1^2 - C_2^2 \sin\theta_1} + \tau_e \quad \text{③}$$

where Lx is the distance between the intersecting points of the inclined surfaces 51a and 52a where vibrators contact the incident surfaces 51b and 52b, i.e., between 1R and 2R; $\theta_1$ is an incident angle of the ultrasonic waves within the wedge; d is the plate thickness of the pipe; D is the internal diameter of the pipe; and N is the number of passages of the ultrasonic waves inside the fluid. In the case of FIG. 9, N=2. $C_2$ is a predetermined sound velocity inside the pipe wall.

As a result, even if the sound velocity $C_3$ of a fluid is unknown, the flow velocity of the fluid inside the pipe 3 can be measured relatively easily on the basis of equations ② and ③. At the same time, since the internal diameter of the pipe 3 is known, the quantity of flow of the fluid inside the pipe 3 can be determined quite easily.

Furthermore, incident points inside an ultrasonic wave transducer need not be strictly specified. Since it is necessary to know only the mounting distance Lx, setting the ultrasonic wave transducer is quite easy.

In addition, since ultrasonic waves emanated from the two ultrasonic wave transducers 51 and 52 have quite small directional angles, the transducers are immune to influences of the resonance mode (plate waves) of the pipe 3 which often becomes a problem in measuring.

However, such a conventional ultrasonic flow velocity measuring method and apparatus thereof cannot be used to measure the flow velocity of a fluid in a high temperature and pressure state (or in a low temperature state), if the construction thereof is not changed, since the vibrators 51B and 52B of the ultrasonic wave transducers 51 and 52 have a maximum operating temperature limit.

In addition, since a velocity gradient is caused in the sound velocity $C_1$ within the wedge because of the temperature gradient caused within this wedge, the sound velocity $C_1$ determined from $t_p$ by using equation ① indicates an average sound velocity within the wedge. The sound velocity $C_1$ has a problem (drawback) in that a large error occurs when the flow velocity of a fluid at a high temperature and pressure is measured, since the sound velocity $C_1$ is obviously different from a sound velocity in which Snell's law is applied because a propagation path for ultrasonic waves is indentified.

SUMMARY OF THE INVENTION

The present invention has been accomplished to solve the above-mentioned problems of the prior art.

An object of the present invention is to provide an ultrasonic flow velocity measuring method which is capable of measuring the flow velocity of a fluid inside a pipe at a high temperature and pressure efficiently and with a high degree of accuracy, and an apparatus thereof.

In order to achieve the above-mentioned objects, the ultrasonic flow velocity measurement method of the present invention comprises the steps of: placing two ultrasonic wave transducers, the directional angles of which are formed considerably small, at a proper distance from each other on the upstream and downstream sides of a pipe to be measured; measuring an average propagation sound velocity $C_1$ in a wedge section inside each of the ultrasonic wave transducer during this taking of this measurement and a sound velocity $C'_1$ on the surface where the wedge contacts the pipe to be measured by making ultrasonic waves alternately enter the pipe from outer walls of the upstream and downstream sides thereof, respectively; oscillating ultrasonic waves from the upstream side to the downstream side of the pipe and vice versa, almost simultaneously with when these measurements are made, and measuring in turn times $t_\alpha$ and $t_u$ from when the ultrasonic waves are oscillated to when they are received after they propagate a wall of the pipe and a fluid inside the pipe; and substituting these measured values $C_1$, $C'_1$, $t_\alpha$ and $t_u$, and a distance Lx between the ultrasonic wave transducers for a predetermined function which has been previously specified, as $V = F(C_1, C'_1, t_\alpha, t_u, Lx)$, and computing this function along with other constants in order to compute the flow velocity V of the fluid inside the pipe.

The ultrasonic flow velocity measuring apparatus comprises ultrasonic wave transducers on the upstream and downstream sides of a pipe along an ultrasonic propagation line, the directional angles of which are considerably small, in which a switching section of the ultrasonic wave transducers for switching alternately a transmission circuit section and a reception circuit section as required is disposed; timing means for measuring propagation times $t_d$ and $t_u$ from when ultrasonic waves are outputted from the ultrasonic wave transducers and transmitted from the upstream side to the downstream side of the pipe and vice versa to when these ultrasonic waves are received after they propagate a wall of the pipe and a fluid inside the pipe, and storing means for storing the propagation times $t_d$ and $t_u$ and a mounting distance Lx between the ultrasonic wave transducers, the above two means being disposed in the reception circuit section; and flow velocity computing means for storing a measured value of an average propagation sound velocity $C_1$ in a wedge section inside each of the ultrasonic wave transducers during the taking of this measurement, a sound velocity $C'_1$ on the surface where the wedge contacts the pipe to be measured and other necessary constants and for performing predetermined computations on the basis of the information outputted from this storing means in order to determine the flow velocity of the fluid inside the pipe.

The aforementioned and other objects, features and advantages of the present invention will become clear when reference is made to the following description of the preferred embodiments of the present invention, together with reference to the accompanying drawings.

DETAILED DESCRIPTION OF THE PREFERRED EMBODIMENTS

An embodiment of the present invention will be explained below with reference to FIGS. 1 through 6.

Figure 1:
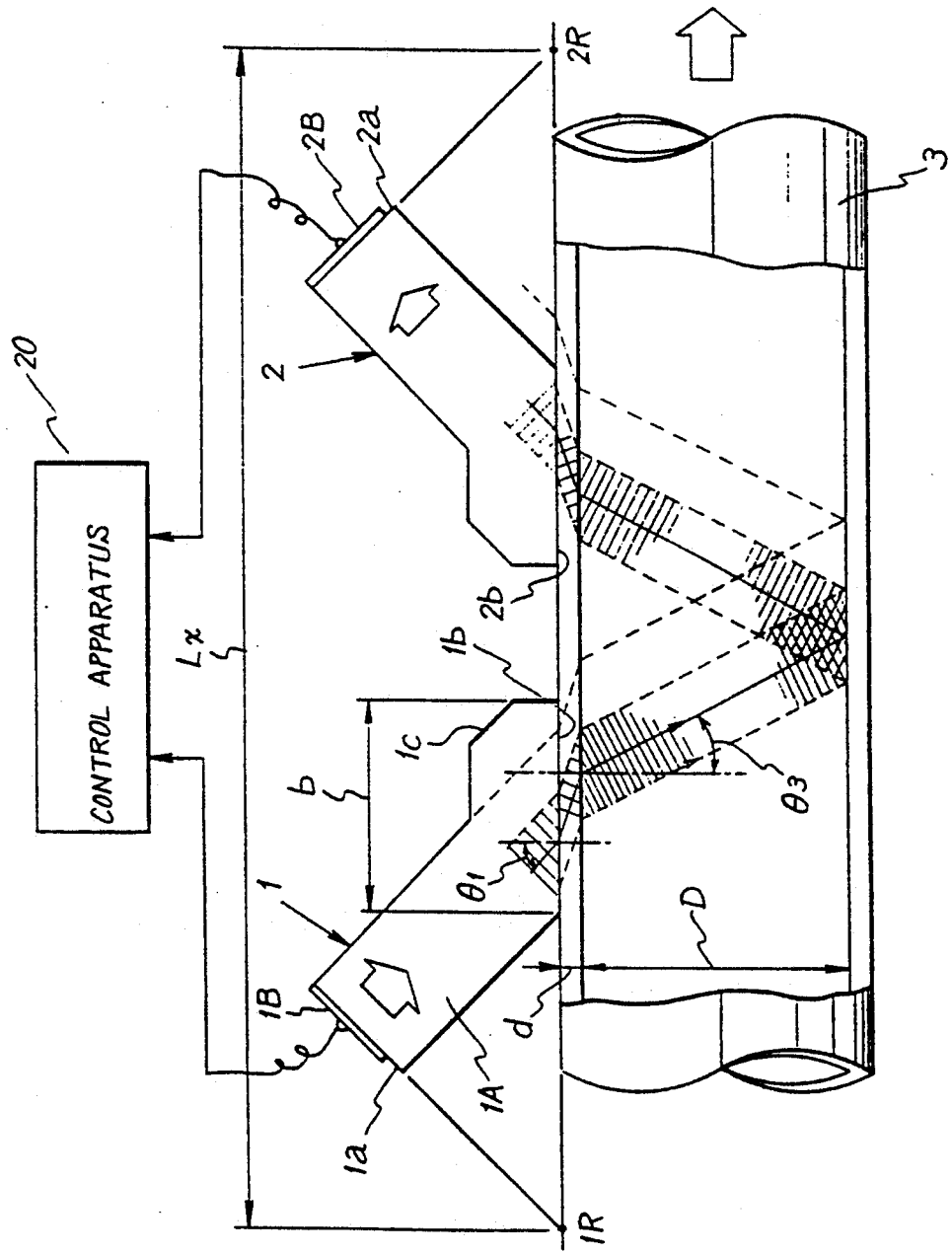
FIG. 1 is a view which illustrates the entire construction of an embodiment of the present invention.
Figure 2:
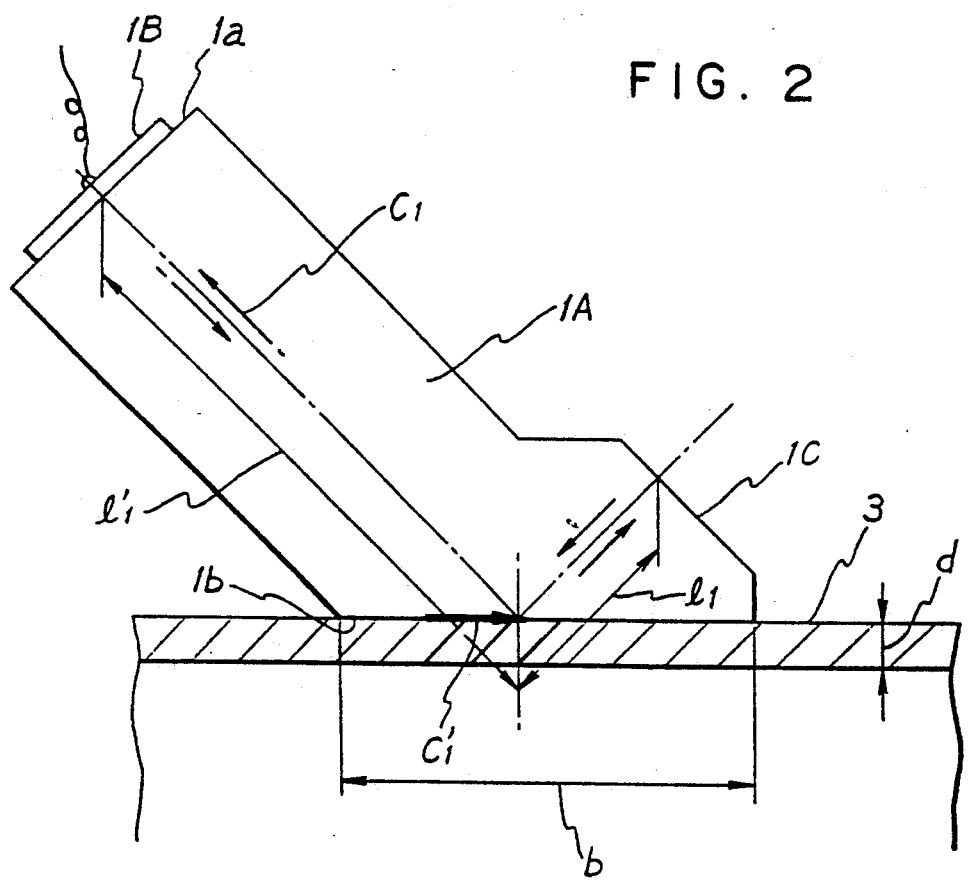
FIG. 2 is a view which illustrates a wedge section in FIG. 1.

In FIG. 1, reference numeral 1 denotes one of the ultrasonic wave transducers disposed on the upstream side of a pipe 3; and reference numeral 2 denotes the other ultrasonic wave transducers disposed on the downstream side of the pipe 3. The one ultrasonic wave transducer 1 comprises a wedge member 1A for making ultrasonic waves obliquely enter the pipe 3 and a vibrator 1B, as shown in FIG. 2. The wedge member 1A is formed of a metal member so that it can withstand high temperatures and the temperature thereof falls below a maximum operating temperature limit of a vibrator at a place of an ultrasonic vibrator 1B by reflecting heat. The entire wedge member 1A is formed into an relatively long guide bar which serves as an ultrasonic propagation path. The vibrator 1B is fixedly mounted on one of the inclined surfaces 1a. The other inclined surface 1c forms an ultrasonic reflection surface intersecting at right angles with a propagation path when ultrasonic waves originating from the vibrator 1B are reflected by an incident surface 1b serving as an ultrasonic incident surface and the ultrasonic waves propagate within the wedge member 1A. Hence, internal reflection waves which propagate inside the wedge member 1A return to the vibrator 1B.

Figure 5:
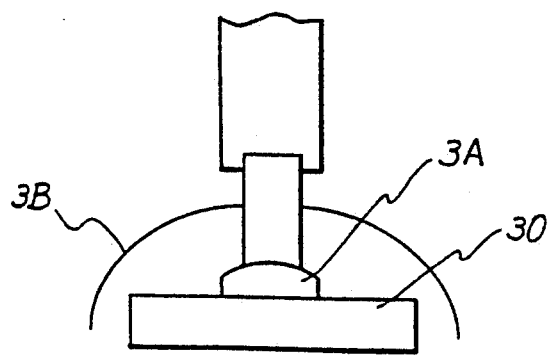
FIG. 5 is a view which illustrates an example of an experiment apparatus.
Figure 6:
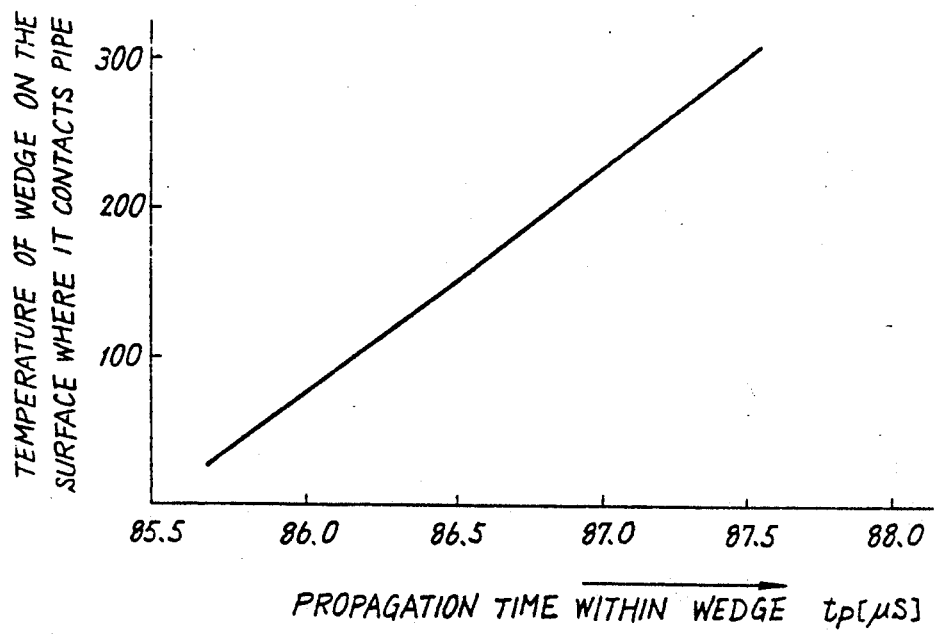
FIG. 6 is a chart which illustrates the relationship between the propagation time of ultrasonic waves and temperatures within a wedge member.

An ultrasonic wave transducer is disposed in a pipe through which a fluid in a high temparature and pressure state flows. Before a flow velocity is measured, a metal plate 3A which simulates an actual pipe to be measured is mounted on a hot plate 30 the temperature of which can be varied, as shown in FIG. 5. By changing the temperature of the hot plate in a state close to the actual state used in which the metal plate 3A is covered with a material 3B to be actually used for keeping it warm, the relationship between $t_p$ and a temperature $T_R$ on a surface where the wedge contacts the pipe to be measured is determined as shown in FIG. 6. From this FIG. 6, the relationship between $t_p$ and $T_R$ is determined by the following equation:

$$T_R = m \cdot t_p + n \qquad (4)$$

where m and n are real numbers.

The length b of the incident surface 1b, which serves as an opening surface when ultrasonic waves inside a pipe are emanated, is set at almost 18 wavelengths or greater with respect to the central frequency used.

Since a directional angle becomes very small when the opening of the vibrator 1B is somewhat long and the length b of the incident surface 1b is almost 18 wavelengths or greater as shown in FIG. 1, an ultrasonic beam, which propagates in turn in the wedge section inside an ultrasonic wave transducer, in the pipe section and in the fluid section inside the pipe, is regarded as a substantially parallel beam.

Figure 3:
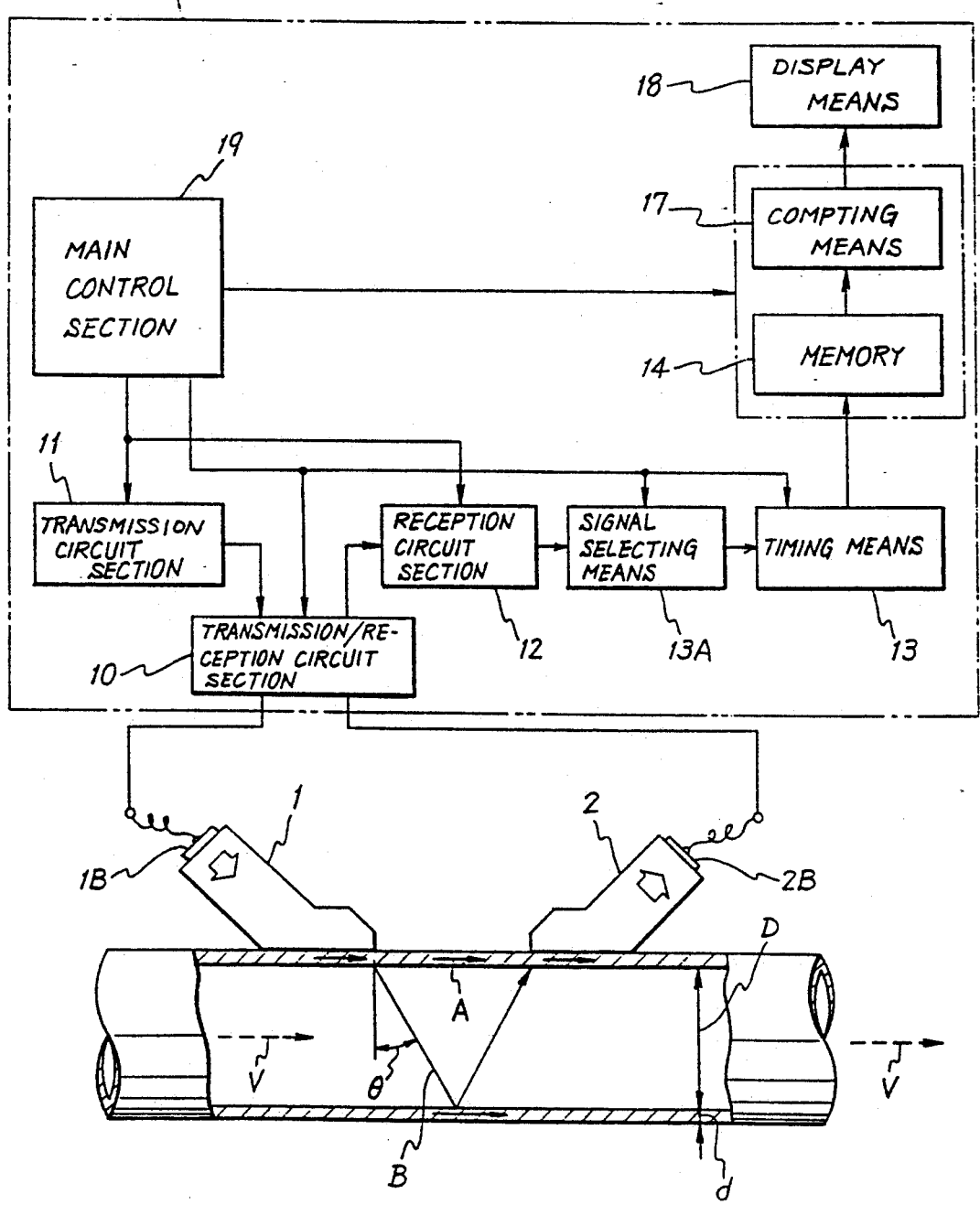
FIG. 3 is a block diagram which illustrates a signal processing system of the apparatus in the embodiment.
Figure 4:
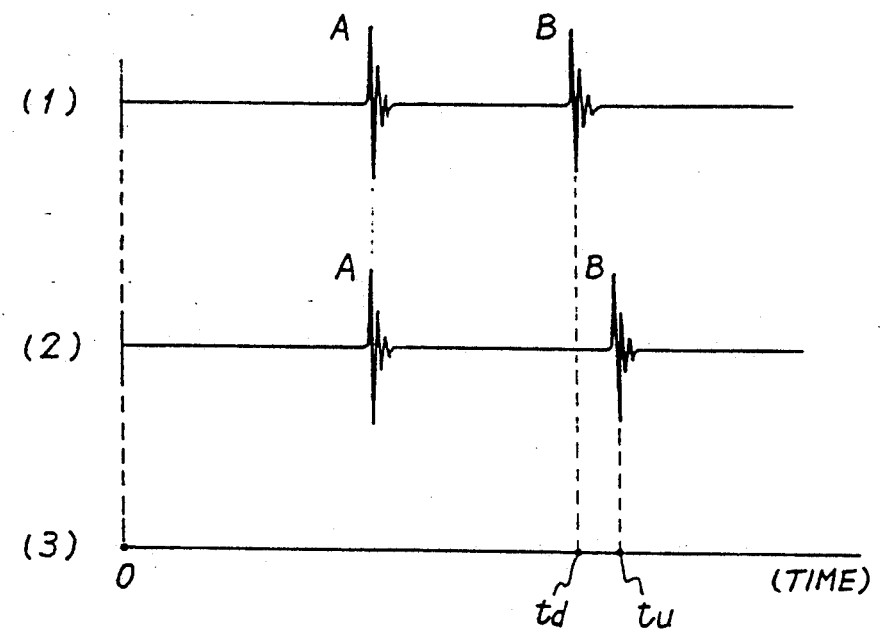
FIG. 4 is a chart which illustrates the measured data of FIG. 3.

The ultrasonic wave transducers 1 and 2 are connected, via a transmission/reception switching section 10, to a transmission circuit section 11 and a reception circuit section 12, respectively, as shown in FIG. 3. Repeat signals shown in FIG. 4 are received by each of the ultrasonic wave transducers 1 and 2 according to the flow velocity inside the pipe 3. As shown in FIG. 3, ultrasonic waves outputted from the ultrasonic wave transducer 1 on the upstream side are divided into propagation waves A which propagate inside the wall of the pipe 3 and propagation waves B which propagate, through the wall of the pipe 3, into the liquid inside the pipe 3.

This will be described in more detail. First, when ultrasonic waves are output from the upstream side toward the downstream side, a signal indicating the reception of incoming ultrasonic waves shown in FIG. 4(1) is sent, via a reception circuit section 12 and a signal selecting means 13A in a control apparatus 20, to a timing means 13 where a propagation time $t_d$ is timed. The time $t_d$ is temporarily stored in a memory 14.

Next, when the transmission/reception switching section 10 is activated and ultrasonic waves are output from the downstream side toward the upstream side, a signal indicating the reception of incoming ultrasonic waves shown in FIG. 4(2) is sent to a timing means 13 where a propagation time $t_u$ is timed and temporarily stored in a memory 14.

Next, almost simultaneously with the above-described operation, an average propagation sound velocity $C_1$, within the wedge inside the ultrasonic wave transducer, and a sound velocity $C'_1$ on the surface where the wedge contacts the pipe to be measured, are measured. This need not be performed each time a flow velocity is measured. It is only necessary that the measurement be performed when required. When the sound velocity within the wedge is measured, either one of the ultrasonic wave transducers 1 and 2 is connected, via the transmission/reception switching section 10 shown in FIG. 3, to the transmission circuit section 11 and the reception circuit section 12. For example, when the ultrasonic wave transducer 1 is connected, ultrasonic waves oscillated from the vibrator IB shown in FIG. 2 are received by the vibrator 1B in FIG. 3 of passages $l'_1$ and $l_1$. This signal is sent, via the reception circuit section 12 and a signal selecting means 13A, to the timing means 13 where the propagation time thereof, $t_p$, is timed and temporarily stored in the memory 14.

Each of the propagation times $t_d$, $t_u$ and $t_p$ stored in the memory 14 is immediately sent to a computing means 17. A flow velocity V computed and determined by this computing means 17 on the basis of equation ② is displayed on a display means 18. Furthermore, the quantity of flow is computed by the computing means 17 from the flow velocity V and the area of the cross section inside the pipe and is also displayed on the display means 18. Reference numeral 13 in FIG. 3 denotes a main control section that controls a series of operations of these component means.

A sound velocity $C'_1$ on the surface where the wedge of the ultrasonic wave transducers 1 and 2 contacts a pipe to be measured is determined by the following equation after $T_R$ is determined from the measured $t_p$ by using equation ④:

$$C'_1 = C_{1(ref)} - d(T_R - T_{(ref)}) \qquad ⑤$$

where d is a temperature coefficient of the sound velocity of a wedge material; $C_{1(ref)}$ is determined by the following equation:

$$C_{1(ref)} = 2(l_1 + l'_1)/(t_p - \tau_e) \qquad ⑥$$

Figure 7:
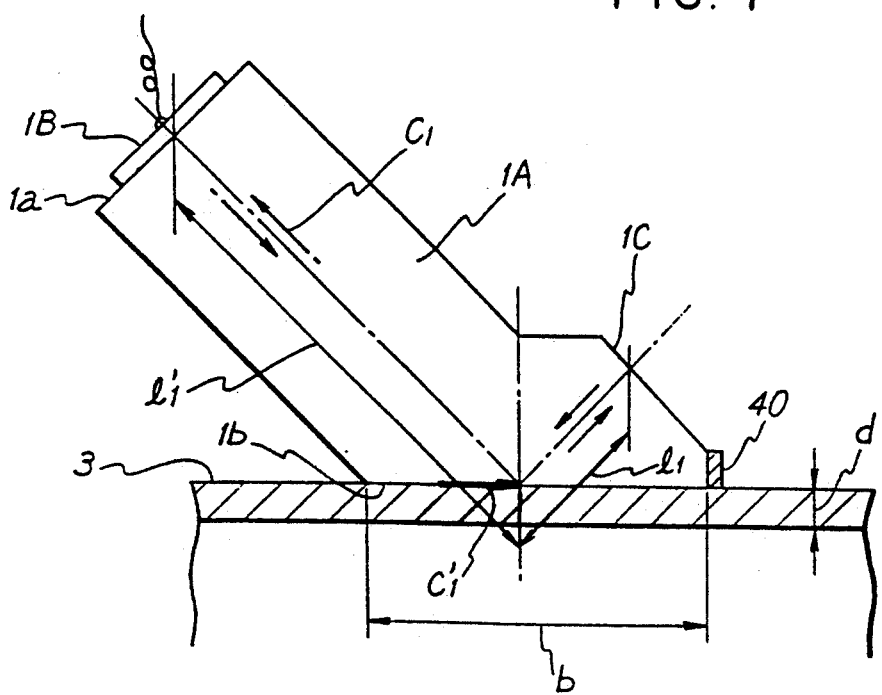
FIGS. 7 and 8 are each views which illustrate other embodiments.

$T_{(ref)}$ is the temperature at that time, $l_1$ and $l'_1$ are the length of the passages $l_1$ and $l'_1$ shown in FIG. 7, respectively, and $\tau_e$ is an electrical delay time inside a cable or the like.

The average sound velocity $C_1$ within the wedge is determined from $C'_1$ by the following equation:

$$C_1 = 2L'_1/[(t_p - \tau_e) - 2(l_1/C'_1)] \qquad ⑦$$

The total propagation time $t$: when the flow velocity $V = 0$ is the following:

$$t_0 = (Lx/C_1)\sin\theta_1 + (2d/C_1C_2 \cdot VIII_1 + (ND/C_1C_3) \cdot VIII_2 + \tau_e \qquad ⑧$$

In the above equation, $$VIII_1 = (C_1C_1 - C_2^2\sin^2\theta_1) / (2b\ C_1^2 - C_2^2\sin^2\theta_1)^{\frac{1}{2}};$$

$$VIII_2 = (C_1C_1 - C_3^2\sin\theta_1) / (C_1^2 - C_3^2\sin^2\theta_1)^{\frac{1}{2}};$$

Lx is the distance between 1R and 2R, intersection points between vibrator contact surfaces 1a and 2a and ultrasonic wave emanating surfaces 1b and 2b respectively; $\theta_1$ is an incident angle of the ultrasonic waves within the wedge; $C_2$ is the sound velocity of a fluid inside the pipe wall; $C_3$ is the sound velocity of a fluid at a high temperature; d is the plate thickness of the pipe; D is the internal diameter of the pipe; and N is the number of passages of ultrasonic waves within the fluid, $N=2$ in the case of FIG. 2.

Rearranging equation ⑧ with respect to $C_3$, we have:

$$C_3 = ND(2C_1C_1 - C_1^2)^{\frac{1}{2}}/IX \qquad ⑨$$

where $$IX = [C_1^2(t_0 - \tau)^2 \pm (ND\sin\theta_1)^2]^{\frac{1}{2}}$$

$$\tau = (Lx / C_1)\sin\theta_1 + [(2d / C_1 C_2)(C_1C_1 - C_2^2 \sin^2\theta_1)/(C_1^2 - C_2^2 \sin^2\theta_1)^{\frac{1}{2}} + ]\tau_e \qquad 10$$

Equation ⑨ indicates that the sound velocity $C_3$ of a fluid at a high temperature and pressure can be determined accurately at any time.

Furthermore, the flow velocity V can be computed by Snell's law as shown below:

$$\sin\theta_1/C_1 = \sin\theta_3/C_3 \qquad 11,$$

$C_3$ and the approximation of V (for instance, when a fluid at a high temperature and pressure is water, $C_3 = 1{,}000$ to $1{,}500$ [m/s], and even the maximum value of V is 20 [m/s]):

$$V = (C_3^2/2ND\tan\theta_3)(t_u - t_d) \qquad 12$$

As a result, if constants (for example, the length $l_1$ of the passage within the wedge, $l'_1$ mounting distance Lx, etc.) necessary for calculating equations ④ through 11 are stored in the memory 14 beforehand, the flow velocity V of a fluid at a high temperatures and pressure state can be computed by using equations ④ through 11.

From the above viewpoint, predetermined functions described in claim 1 refer to all of a group of functions including equations ④, ⑤, ⑦, 10 and 11 with equation 12 as the center.

FIG. 7 shows another embodiment.

In this embodiment, $T_R$ need not be determined from $t_p$ by using the relationship of FIG. 6 by a method in which a temperature sensor 40 is mounted at a place near a pipe to be measured of the wedge section of an ultrasonic wave transducer and a temperature $T_R$ on the surface where the wedge contacts the pipe to be measured is directly monitored. An example of mounting the temperature sensor 40 is shown in FIG. 7.

Figure 8:
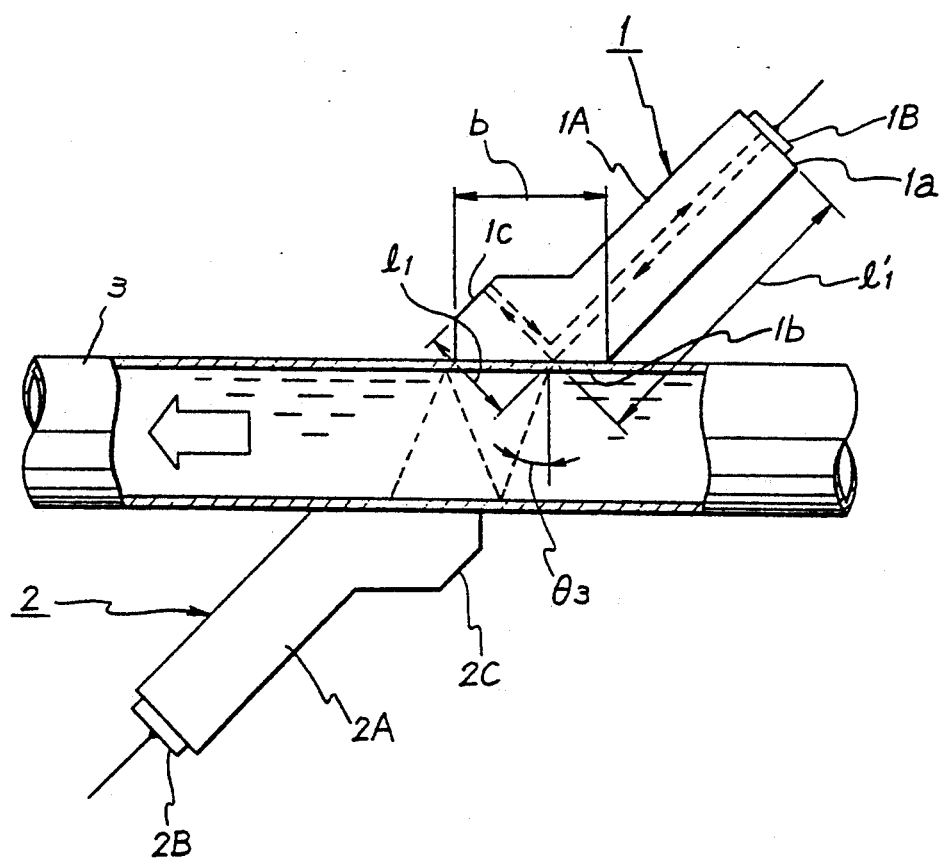
Figure 9:
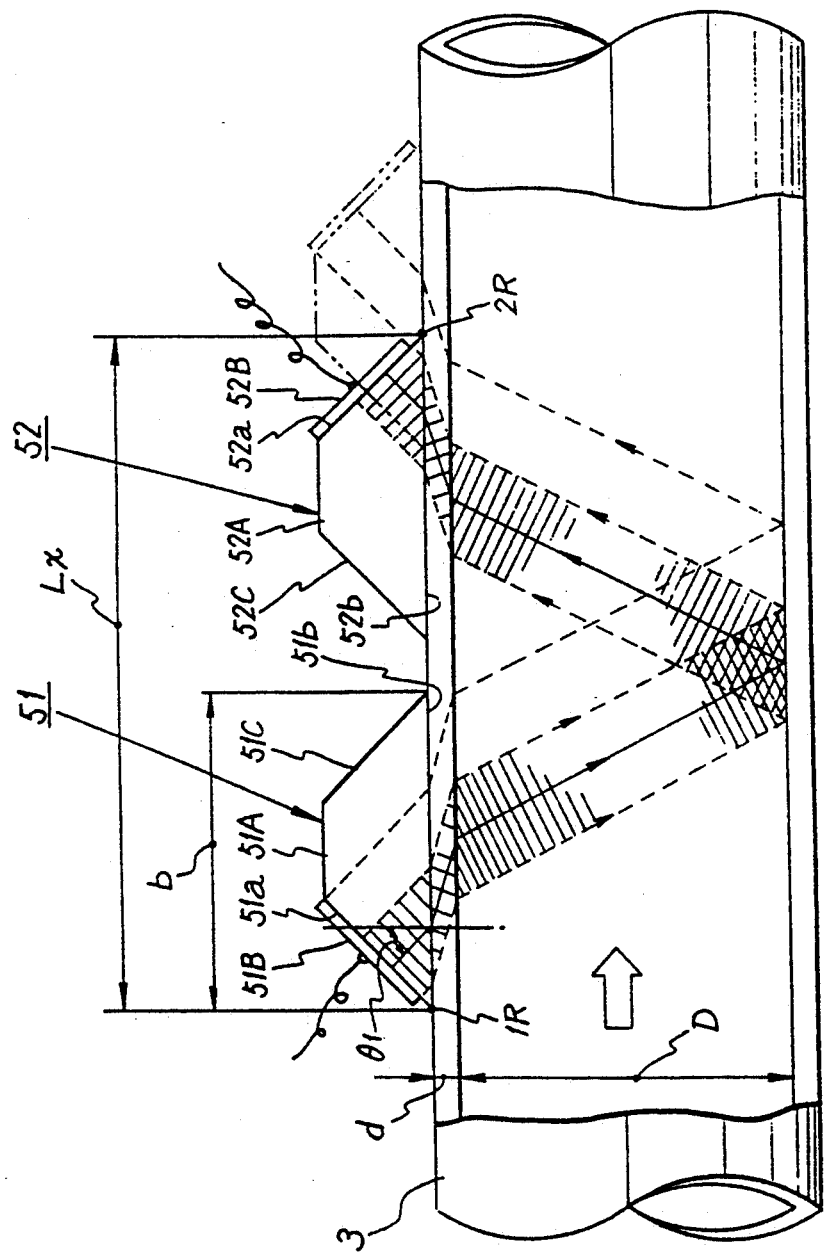
FIGS. 9 and 10 are each views which illustrate a conventional apparatus.
Figure 10:
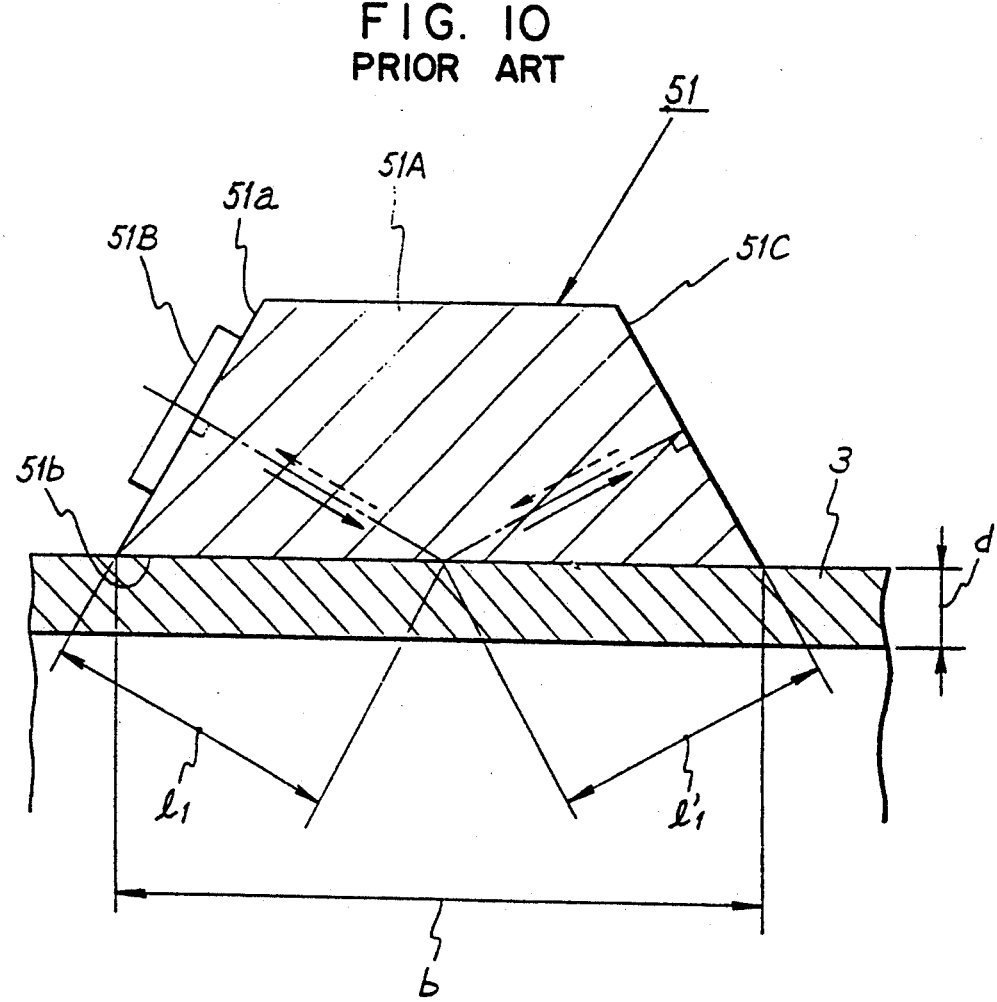

FIG. 8 shows a further embodiment. In this embodiment, the position of the ultrasonic wave transducer 2 on the downstream side is changed. Measurement of flow velocity is possible on principles similar to that described above by changing the number N of propagation passages or the like.

The present invention can be applied not only to flow velocity measurement of fluids at high temperatures and pressure but also to flow velocity measurement of very low-temperature fluids, such as liquid nitrogen, liquid oxygen or liquefied natural gas, by using an ultrasonic wave transducer, having a wedge section in the form of a guide bar, in which a wedge member is used which can withstand low temperatures for the purpose of protecting vibrators which are ultrasonic wave generating sources.

Since the present invention is constructed and functions as described above, it can provide an ultrasonic flow velocity measuring method and apparatus thereof for fluids at high temperatures and pressure by accurately measuring an average sound velocity in the wedge section of an ultrasonic wave transducer having a temperature gradient, namely, a sound velocity gradient, and a sound velocity on the surface where the wedge contacts the pipe to be measured. The present invention has noted advantages such that the flow velocity measurement can be performed with a high degree of accuracy without requiring temperature compensation.

Many different embodiments of the present invention may be constructed without departing from the spirit and scope of the present invention. It should be understood that the present invention is not limited to the specific embodiments described in this specification, and is only limited in the appended claims.

What is claimed is:

1. An ultrasonic flow velocity determination method, comprising the steps of:

placing two ultrasonic wave transducers, including wedge sections, the directional angles of which are formed considerably small, at a proper distance from each other on the upstream and downstream sides of a pipe to be measured;

determining an average propagation sound velocity $C_1$ in a wedge section inside each of the ultrasonic wave transducers during said determination of the flow velocity and determining a sound velocity $C'_1$ on the surface where the wedge section contacts the pipe to be measured by making ultrasonic waves alternately enter the pipe from outer walls of the upstream and downstream sides thereof, respectively;

oscillating ultrasonic waves from the upstream side to the downstream side of the pipe and vice versa, at approximately the same time that said sound velocities are determined, and measuring in turn times $t_d$ and $t_u$ from when the ultrasonic waves are oscillated to when they are received after they propagate a wall of the pipe and a fluid inside the pipe; and substituting the determined values $C_1$ and $C'_1$, and the measured values $t_d$ and $t_u$, and a distance Lx between the ultrasonic wave transducers into the predetermined function $V = F(C_1, C'_1, t_d, t_u, Lx)$, and computing this function along with other constants in order to compute the flow velocity V of the fluid inside the pipe.

2. An ultrasonic flow velocity determination apparatus, comprising:

ultrasonic wave transducers on the upstream and downstream side of a pipe, including wedge sections, along an ultrasonic propagation line, the directional angles of which are considerably small, in which a switching section of the ultrasonic wave transducers for switching alternately a transmission circuit section and a reception circuit section is disposed;

timing means for measuring propagation times $d_d$, $t_u$ and $t_p$, from when ultrasonic waves are outputted from the ultrasonic wave transducers and transmitted from the upstream side to the downstream side of the pipe and vice versa to when these ultrasonic waves are received after they propagate a wall of the pipe and a fluid inside the pipe, and from when internal reflection waves propagated inside said wedges sections are reflected within said wedge sections and return to said transducers, respectively, and means for storing said propagation times $t_d$, $t_u$, $t_p$ and a mounting distance Lx between said ultrasonic wave transducers, said timing means and said means for storing propagation times being disposed in said reception circuit section;

means for measuring a reference temperature $T_{(ref)}$ where each said wedge section contacts a surface of the pipe to be measured, for use in determination of a sound velocity $C'_1$;

means for determining an average propagation sound velocity $C_1$ in each said wedge sections inside each of said ultrasonic wave transducers during the determination of the flow velocity, and the sound velocity $C'_1$ on the surface where each said wedge contacts the pipe to be measured;

means for storing said determined value of the average propagation sound velocity $C_1$ in each said wedge section inside each of said ultrasonic wave transducers, said sound velocity $C'_1$ on the surface where each said wedge contacts the pipe to be measured, and other necessary constants; and means for performing predetermined computations on the basis of the information outputted from said propagation times storing means and said means for storing velocities in order to determine the flow velocity of the fluid inside the pipe.

3. An ultrasonic flow velocity determination apparatus according to claim 2, wherein each of said wedge sections comprises an ultrasonic-wave propagation passage having first and second ends along the length thereof, and wherein an ultrasonic reflection surface is disposed on said first end and each of said ultrasonic wave transducers is disposed on said second end to enable determination of said average propagation velocity $C_1$ and said sound velocity $C'_1$.

4. An ultrasonic flow velocity determination apparatus according to claim 2, wherein said ultrasonic wave transducers each further comprise a vibrator for emitting ultrasonic vibrations, and each said wedge is formed of a metal member, to withstand temperatures which are higher than those being capable of handled by wedges made of acrylic resins, and to reflect heat from said vibrator in each of said ultrasonic wave transducers.

5. An ultrasonic flow velocity determination apparatus according to claim 4, each said ultrasonic wave transducer further comprising a vibrator mounted section having an elongated guide bar shape.

* * * * *

UNITED STATES PATENT AND TRADEMARK OFFICE
CERTIFICATE OF CORRECTION

PATENT NO. : 5,280,728
DATED : January 25, 1994
INVENTOR(S) : T. SATO et al.

It is certified that error appears in the above-indentified patent and that said Letters Patent is hereby corrected as shown below:

On the cover sheet, section [57] of the printed patent, line 1 of the abstract, change "An ultrasonic flow" to ---This invention relates to an ultrasonic flow---.

At column 4, line 26 of the printed patent, change "IA" to ---1A---.

At column 4, line 33 of the printed patent, change "IA" to ---1A---.

At column 4, line 39 of the printed patent, change "IB" to ---1B---.

At column 4, line 42 of the printed patent, change "IA" to ---1A---.

At column 6, line 19 of the printed patent, change "$C_1 = 2L'_1$" to --- $C_1 = 2\ell'_1$ ---.

At column 6, line 21 of the printed patent, change "t:" to ---$t_0$---.

At column 6, line 28 of the printed patent, change "$26C_1^2$" to ---$C'_1 2$---.

At column 6, line 28 of the printed patent, change "•" to ---+---.

UNITED STATES PATENT AND TRADEMARK OFFICE
CERTIFICATE OF CORRECTION

PATENT NO.  : 5,280,728

DATED       : January 25, 1994

INVENTOR(S) : T. SATO et al.

It is certified that error appears in the above-indentified patent and that said Letters Patent is hereby corrected as shown below:

At column 7, line 3 of the printed patent, change "11" to ---(11)---.

At column 7, line 6 of the printed patent, change "11" to ---(11)---.

At column 7, lines 9 and 10 of the printed patent, change "7,10 and 11 with equation 12" to ---(7), (9), (10) and (11) with equation (12)---.

At column 8, line 29 (claim 2, line 11) of the printed patent, change "$d_d$" to ---$t_d$---.

Signed and Sealed this

Eleventh Day of February, 1997

Attest:

*Attesting Officer*

BRUCE LEHMAN

*Commissioner of Patents and Trademarks*